March 29, 1938.  E. HAZELL  2,112,529

MICROPOROUS RUBBER

Filed Oct. 17, 1934

DISPERSING HYDROPHILIC COLLOID & WATER IN A SOLID RUBBER COMPOSITION

SHEETING THE MIX TO DESIRED SHAPE WITH THE RUBBER MAINTAINED AS A CONTINUOUS PHASE

DISPOSING THE SHEET BETWEEN A LINER TO CONTROL SWELLING

CURING THE SHEETED STOCK UNDER NON-EVAPORATIVE CONDITIONS TO DEVELOP MICRO-POROSITY

INVENTOR.
EARDLEY HAZELL
BY Gourley & Budlong
ATTORNEYS

Patented Mar. 29, 1938

2,112,529

UNITED STATES PATENT OFFICE 2,112,529

MICROPOROUS RUBBER

Eardley Hazell, New York, N. Y., assignor to United States Rubber Company, New York, N. Y., a corporation of New Jersey Application October 17, 1934, Serial No. 748,692

8 Claims. (Cl. 18—53)

This invention relates to the production of microporous products from plastic compositions and more particularly to an improved process of producing the same from rubber and rubber-like materials. The invention also relates to the resulting products.

An object of this invention is to produce microporous articles from thermo-setting plastic compositions. Another object is to produce a microporous rubber body directly from solid rubber (crude or reclaim). A further object is to produce a rubber diaphragm which is adapted to be used as a separator in electric primary or secondary cells, electrolytic cells, filters and the like. A still further object is to produce such a diaphragm which is highly resistant to chemical and electrolytic action, which is highly permeable to water, and which is highly efficient as a means for allowing conduction of electric current while preventing passage of fine particles through its pores. Other objects will be apparent from the following description.

The invention broadly comprises incorporating in a thermo-setting plastic composition containing lyophilic material, a liquid that is substantially a non-solvent of the plastic and, while maintaining the liquid disseminated throughout the mass, setting or curing the composition by heat to a rigid or semi-rigid microporous state under non-evaporative conditions for the absorbed liquid. The mass when set or cured may be of any desired shape. The articles may be embossed, fluted, corrugated or otherwise designed, before, during or after the curing or setting operation.

More specifically, the invention comprises masticating any ordinary commercial grade of solid rubber such as pale crepe, or smoked sheet, or reclaimed rubber, or mixtures thereof, on a mill, with or without the aid of the usual plasticizers, to a smooth plastic consistency and milling into the plastic rubber mass vulcanizing and filling ingredients, together with a relatively large amount of hydrophilic colloid, and water. The water should be in an amount at least sufficient to permit smooth working of the mass but insufficient to invert the rubber phase, that is, such proportions of water should be added as to maintain the whole as an elastic rubber-like mass capable of being sheeted and calendered. On a basis of 100 parts by weight of rubber, good results are obtainable by using about 1 part of water for every 5 parts of colloid added.

The amount of water will vary somewhat with the nature of the colloid. It is to be understood that the function of the water in the mixing operation is to facilitate calendering and shaping of the stock and to initiate a swelling of the mix by the attraction between water and its lyophil. The amount of water added in the mixing operation is but part of the water that is necessary to develop the maximum swelling capacity of the rubber mix and therefore additional water is introduced after the calendering or sheeting operation. The total volume of water introduced into the mass may be of the same order as the volume of the rubber itself in the rubber mix and may even exceed somewhat the volume of the rubber.

Where water is the swelling liquid, any hydrophilic colloid may be used, among them being types ordinarily used for making aqueous rubber dispersions, for example, colloidal clays such as bentonite and Silurian shale, starch, water soluble soaps, proteins such as casein, etc. The hydrophil is milled into the rubber, preferably in either dry or aqueous paste form, together with the other desired compounding and vulcanizing ingredients until a uniform mix is obtained, and then this mix has water worked into it gradually, preferably on a mill having corrugated rolls, the addition of the water being effected in a manner known to those skilled in the art, as to prevent the inversion of the plastic mass to a rubber-in-water dispersion. Accordingly the water is preferably added only about as fast as it is absorbed. This operation may also be carried out on an open mill with smooth rolls or in a mixer of the closed type such as a Banbury or a Day or a Werner and Pfleiderer machine. It is preferred to use corrugated rolls for the reasons that the water is thereby worked into the rubber mass in more intimate association with the hydrophil and that the rubber mix is prevented from slipping and thereby escaping mechanical action. The plastic rubber-like mass thus prepared contains the rubber as the external or continuous phase having uniformly dispersed therein the added water in intimate association with the hydrophil. Such a dispersion is sharply distinguished from an aqueous dispersion wherein the water is the external or continuous phase and the rubber the dispersed phase.

After the addition of the water on the mill or mixer, the rubber mass is ready for shaping, as by calendering, which may be at once or after allowing the mass to stand awhile. The mass is calendered or otherwise sheeted to a desired thickness, or may be processed in any other manner into the shape of the article desired, as by extruding, molding, etc. If desired, the sheeted or otherwise shaped rubber mass may be submerged in water to allow imbibition of more water. A fair degree of swelling results if the compound is soaked in water at room temperature for a period of at least 24 hours. If higher swelling temperatures are used, they should be below the temperature at which the mass sets or cures.

When the material has been sheeted it may be wrapped on a mandrel with a wet liner for the material. This may be done by rolling the stock from the calender into a wet liner, and then re-rolling onto a mandrel between a wet liner after passage through a water bath. In order to allow the sheet to swell freely without too much confining pressure and to give a product of uniform gauge, the longitudinal edges of the liner may be built up by a fabric tape of suitable thickness to provide a liner having raised edges or borders. Alternatively the sheeted stock may be wrapped in a single or double napped sheeting, preferably of coarse weave, thus providing a cushioning effect against pressures developed during swelling. The wrapping tension should not be greater than that necessary to avoid wrinkling of the liner so as not to interfere with proper swelling and uniform gauge.

After soaking the stock in water at room temperature or at a higher temperature below the vulcanizing temperature, the stock is given a cure under non-evaporative conditions for the absorbed water, as by vulcanizing the shaped rubber mass, preferably wrapped as described, while it is under water heated to a vulcanizing temperature. Such a cure is referred to as a submarine cure. The resulting vulcanizate is permeated with minute pores which may range from an average pore diameter of 0.5 micron or less to about 6.5 microns. The larger size is more desirable for filters. Smaller average diameters may be obtained by tighter wrapping of the stock during the swelling and/or curing stages, and by regulation of loading with lyophilic colloid. The increase in gauge of the stock as a result of the imbibition of water is usually of the order of 100 to 150%.

After curing, the articles may be dried, but are preferably kept wet to exclude air, for example by submergence in water. The microporous structure remains intact and is highly permeable to liquids such as electrolyte solutions.

If better dispersion of the lyophil and better distribution of the liquid is desired, a peptizing agent for the lyophil, as distinguished from a flocculating agent, may be added with the lyophilic colloid. The use of the peptizing agent increases the average pore diameter of the product, without appreciably changing the percentage of total voids. This favors lower electrical resistance to electrolyte solutions.

If desired, cellulosic fibres may be added to the mix and/or various wetting agents may be added, in order to modify the physical and electrical properties of the product, as desired.

In the manufacture of electric battery plate separators, sheets of the highly hydrated rubber composition of the desired thickness and containing a proportion of sulfur suitable for the production of hard rubber, are preferably wrapped on a mandrel and vulcanized under water as above described, and are then rolled out flat and cut to the desired final dimensions while still hot and wet. If desired, they may be fluted or corrugated, as by passing them between suitable corrugated calender or other rolls or by pressing them in suitable molds, while hot. Alternatively, the dried separators may be ribbed as by cementing thereon ribs of porous hard rubber, hard rubber, wood, etc. by means of a cement and then may be placed in water and subjected to a vacuum for at least an hour, or boiled in water, to displace air from the separator. As another alternative, sheets of suitable thickness may be calendered and cured as above described, and may then be ground down to form channels in one face, leaving reinforcing bands, ridges, or ribs between the channels. The separators should afterwards be kept wet, as by immersion under water until assembled in a battery.

The following example is given to illustrate the invention more particularly in the production of battery plate separators, a general process of which is shown in the drawing. The parts are by weight:

Example 1.—A mix is prepared from the following formula:

| | Parts |
|---|---|
| Pale crepe | 100 |
| Bentonite | 100 |
| Diphenylguanidine | 4 |
| Sulfur (sifted) | 45 |
| Nekal | 1 |
| Sodium silicate (as 40% sol.) | 3 |
| Cellulose flock (alpha variety, —40 mesh) | 40 |
| Water | 20 |

Nekal is a wetting agent and is understood to be sodium isopropyl naphthalene sulphonate. It serves to reduce the initial electrical resistance upon immersion of the separator in battery acid to a small fraction of the initial resistance where no wetting agent is used. Other wetting agents may be used instead. The sodium silicate peptizes the bentonite and increases the average pore diameter of the finished plate. Instead of diphenylguanidine other accelerators of vulcanization may be used. Alpha cellulose is less resistant to the hydrolyzing action of acids and alkalies than beta cellulose, although the latter may be used. The alpha cellulose helps to improve the electrical conductance of the separator and especially so when the cured separator containing the cellulose is submitted to the action of a hydrolyzing or a swelling agent for the cellulose, for example sulphuric acid of 30–50% weight concentration, or 1 to 10% sodium hydroxide solution, at elevated temperatures, for example 100–120° C. After the acid or alkali treatment, the separators are washed with water and kept wet until used. It is believed that in the case of acid treatment, partial hydrolysis of the cellulose confers on the cellulose a gel structure similar to that resulting from the action of battery acid on wood separators. The acid treatment may be carried out before or after the stock is cut to size.

In preparing each mix the rubber is first well broken down, and all the ingredients, except the water, then added and dispersed uniformly throughout the rubber in known manner while cooling the mill rolls. The batch is then transferred to a corrugated roll mill and the water added as rapidly as it is absorbed by the mass. The mix is then warmed up, calendered to about 40 percent of the ultimately desired thickness, taken up on a water-soaked fabric liner, the edges of which are taped as described, and the calendered sheet with the liner is wrapped on an aluminum mandrel under sufficient tension to prevent wrinkling. The wrapped stock may be made to adsorb still more water by immersing it in warm water for several hours, and this procedure is desirable when the amount of water introduced by milling has been less than 100 parts per 100 parts of rubber. At room temperature the immersion should be for at least 12 hours, and may be supplemented by preheating the compound in the vulcanizer under water at a temperature of about 115° C. for at least one hour in order to develop maximum swelling. The material is then vulcanized to hard rubber by bringing the water rapidly to the curing temperature for example 156° C. and maintaining the curing temperature for about 3 hours. Another schedule is, for example, heating one hour under water at from 125° to 135° C. followed by five hours at about 145° C. The temperature is brought down gradually with cold water before releasing the pressure in the vulcanizer. During the course of the cure there is a substantial increase in the gauge of the sheet. The hot wet stock may then be cut to the desired size.

The microporous battery plate separators prepared by the described process are found to have an average pore diameter of from 0.5 to 4 microns. The percentage of voids ranges from 55 to 65% and is dependent on the amount of water imbibed into the rubber composition before cure, which in turn may be controlled by (a) the loading of lyophil colloid, (b) the time and temperature of the soaking in water, and (c) the tightness of wrapping the calendered sheet.

A wide variation is permitted in the proportion of lyophil colloid employed, the weight thereof preferably not exceeding the weight of the rubber, in order to avoid undue brittleness in the vulcanized product. In the case of whole latex rubber such as spray dried latex rubber, which contains a small amount of natural hydrophilic materials, the amount of added hydrophil need not be as great as with other rubbers lacking hydrophils. Likewise the precise amount of water to be incorporated in the mass by milling, is immaterial, since further quantities of water are readily absorbed by immersion of the mass in water. It is probable that still further water is absorbed during the submarine cure.

An efficient battery plate separator should have as high a percentage of pore voids as is consistent with fair mechanical strength, and the upper limit of pore diameter should be such as to prevent lead tree growth in the battery. Furthermore the separator should be of sufficient strength, even with a fairly high percentage of voids, to withstand handling without breakage.

The separator of the present invention is distinguished from other known hard rubber separators in the following respects:

(a) In strength it is superior to the compacted hard rubber dust separators and to separators produced directly from latex. The rubber dust separators are even too fragile to cut for test samples. The latex separators approximate a strength of 500–600 pounds per sq. in. in all directions, whereas a separator can be prepared by the present invention which approximates a strength of from about 1000 to about 1200 lbs. per sq. inch in the direction of the grain (due to the calendering) and approximately 500 to 600 pounds per sq. inch across the grain.

(b) The percentage of voids in applicant's product ranges as high as 65% whereas the maximum percentage found in the latex separators is about 53%, and in the rubber dust separators about 50%.

(c) The separator of the present invention has a lower equilibrium resistance than the other separators. By equilibrium resistance is meant the constant electrical resistance that the separator exhibits after the battery is put in operation and current has been drawn from it long enough for the resistance of the separators to reach a constant minimum value. Wood separators require several days before they reach this value, while the separators of this invention, made from a rubber composition containing a wetting agent as above described, reach a constant value in about one-half hour. The resistance curve drops from the time the current is turned on and adjusts itself to a substantially constant minimum value. For example, at 0° F. a separator of the present invention registered around 20 percent lower equilibrium resistance than the other products. This is a desirable property because it will allow an electric battery to more quickly start a motor car engine at low temperatures. Even at temperatures as high as 80° F. the separator of the present invention has an equilibrium resistance around 5 percent lower than that of the other types of separators.

The term "rubber" is to be construed broadly as including caoutchouc, gutta percha, balata, rubber isomers, as well as other rubber-like substances which similarly to rubber may be vulcanized or set.

Other rubbers that may be treated within the broad scope of the invention are the evaporation residues of the various latices, for example spray dried whole latex rubbers. In addition, the invention includes within its broad scope variations such as adding a hydrophile, that is, a material which is capable of absorbing and of being swelled by water, to latex or aqueous dispersion of rubber, drying and shaping the mass as desired, soaking the shaped mass in an aqueous medium and then curing the mass under non-evaporative condition for the water.

It will be apparent to those skilled in the art that certain modifications in the amounts of materials specified in the examples may be made, and that impure or commercial grades of materials may be used in place of chemically pure substances, without departing from the principles of the invention as covered by the appended claims.

Having thus described my invention, what I claim and desire to protect by Letters Patent is:

1. A method of making a microporous vulcanized hard rubber article which comprises plasticizing a solid rubber mass in which the rubber phase is continuous and non-dispersed until the mass attains a smooth plastic consistency, and preparing a highly hydrated vulcanizable rubber mix from said solid rubber mass by steps including mixing therewith sulphur sufficient to form hard rubber, a hydrophilic colloid and water, without inversion of the continuous rubber phase, then shaping the hydrated rubber mix and curing the shaped mass under non-evaporative conditions.

2. A process of making microporous vulcanized hard rubber battery plate separators which comprises curing a sheet of solid rubber composition containing sulphur sufficient to form hard rubber and in which the rubber is a continuous phase, said sheet having uniformly disseminated therein a substantial amount of water in association with an inorganic hydrophilic colloid, said curing being conducted under non-evaporative conditions and under positive confining pressure for regulating the porosity and degree of swelling of the mass.

3. A process of making microporous vulcanized hard rubber battery plate separators which comprises incorporating water into a solid rubber composition in which the rubber is a continuous phase, said water being worked into the said solid rubber in association with an inorganic hydrophilic colloid, and compounding and vulcanizing ingredients, the water being in quantity at least sufficient to permit smooth working of the mass without inversion of the continuous rubber phase, whereby to render the mass calenderable, then sheeting the stock, wrapping the sheeted stock under tension on a mandrel or its equivalent with a fabric liner interposed between successive turns, and subjecting the stock to a submarine cure.

4. A process of producing microporous vulcanized hard rubber battery plate separators which comprises intimately incorporating with a vulcanizable solid rubber composition in which the rubber is a continuous phase, an inorganic hydrophilic colloid, and water, under conditions preserving the continuity of the continuous rubber phase, the amount of said colloid being not substantially greater than the amount of rubber, then sheeting the rubber mix, curing the sheeted stock under non-evaporative conditions, and submitting the cured sheet to the action of sulphuric acid.

5. A process of producing a microporous vulcanized hard rubber product which comprises incorporating into a solid rubber composition in which the rubber is a continuous phase, a liquid which is substantially a non-solvent for the rubber base, and a lyophil for said liquid, without inverting the continuous rubber phase, and sulphur sufficient to form hard rubber, and then, while maintaining the incorporated liquid uniformly disseminated throughout the mass, shaping the mass, and thereafter curing the composition by heat to a rigid or semi-rigid microporous state under non-evaporative conditions and under positive confining pressure for regulating the porosity and degree of swelling of the mass.

6. A process of making microporous vulcanized hard rubber battery plate separators which comprises curing a sheet of solid rubber composition containing sulphur sufficient to form hard rubber and in which the rubber is a continuous phase, said sheet having uniformly disseminated therein a substantial amount of water in association with a hydrophilic clay, said curing being conducted under non-evaporative conditions and under positive confining pressure for regulating the porosity and degree of swelling of the mass.

7. A process of making microporous vulcanized hard rubber battery plate separators which comprises curing a sheet of solid rubber composition containing sulphur sufficient to form hard rubber and in which the rubber is a continuous phase, said sheet having uniformly disseminated therein a substantial amount of water in association with an inorganic hydrophilic colloid, and finely divided cellulose, said curing being conducted under non-evaporative conditions and under positive confining pressure for regulating the porosity and degree of swelling of the mass.

8. A method of preparing a microporous vulcanized hard rubber battery plate separator which comprises plasticizing a solid rubber mass in which the rubber phase is continuous and nondispersed until the mass attains a smooth plastic consistency, and preparing a highly hydrated vulcanizable rubber mix from said solid rubber mass by steps including mixing therewith sulphur sufficient to form hard rubber, and an inorganic colloid in association with water, without inversion of the continuous rubber phase, thereafter sheeting the hydrated solid rubber mass and curing the hydrated solid rubber mass under non-evaporative conditions and under positive confining pressure for regulating the degree of swelling of the mass.

EARDLEY HAZELL.